INVENTOR.
HORACE P. BROWNSEY
BY
Wallace and Cannon
ATTORNEYS

INVENTOR.
HORACE P. BROWNSEY
BY
Wallace and Cannon
ATTORNEYS

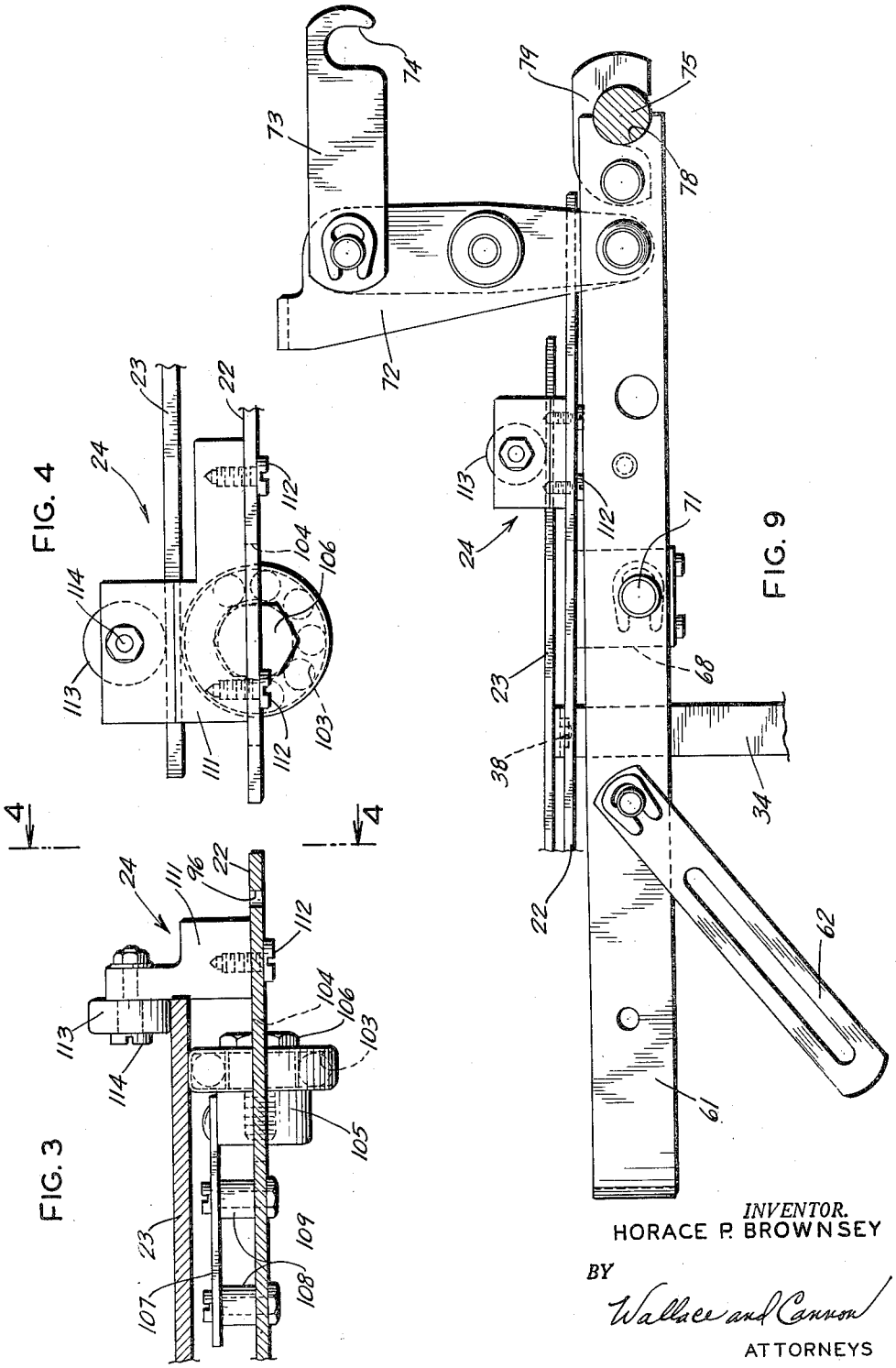

Jan. 30, 1962 H. P. BROWNSEY 3,019,017
FEEDING MECHANISMS

Filed Dec. 2, 1959 5 Sheets-Sheet 4

*INVENTOR.*
HORACE P. BROWNSEY

BY
*Wallace and Cannon*
ATTORNEYS

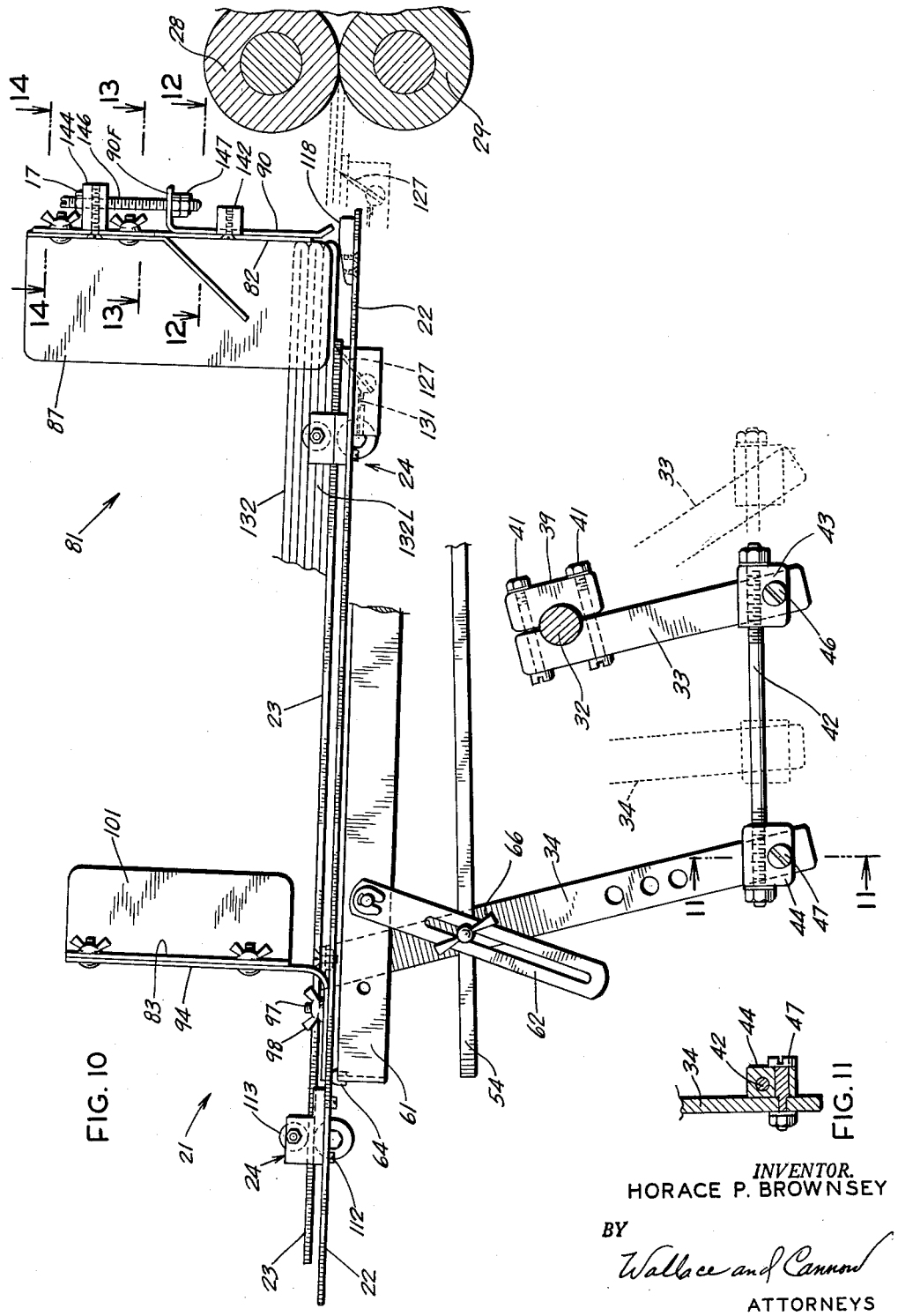

United States Patent Office 3,019,017
Patented Jan. 30, 1962

3,019,017
FEEDING MECHANISMS
Horace P. Brownsey, Willoughby, Ohio, assignor to Addressograph-Multigraph Corporation, Cleveland, Ohio, a corporation of Delaware
Filed Dec. 2, 1959, Ser. No. 856,705
14 Claims. (Cl. 271—44)

This invention relates to a feeding mechanism adapted for use with a printing machine. More specifically, this invention relates to a feeding mechanism which incorporates needle assemblies at a forward edge of a reciprocatory shuttle plate for separating and feeding lowermost articles from a stacked group in one-by-one relation to a transport mechanism associated with the printing machine.

It is conventional practice to stack a group of newspapers, booklets, or the like in a supply magazine above a reciprocating shuttle plate in a manner such that movement of the shuttle plate in a feeding direction is effective to separate the lowermost article from the stack and feed such an article to a transport mechanism, which, in turn, advances the article to a printing station of a printing machine. In feeding such booklets, pamphlets, small magazines, and especially soft newsprint, it is desirable that the feeding mechanism positively engage each individual article so as to insure separation of an individual article from the stack to thereby prevent both skipping and possible jamming during a high speed printing operation.

To accomplish such desirable positive engagement of the feeding mechanism with each individual article being separated and fed to the printing machine, it has been proposed to utilize a plurality of needles at the forward edge of the shuttle plate for piercingly engaging a corresponding forward edge portion of the article being fed. Several problems are presented in the use of such needles. To be effective the needles must project upwardly from the upper surface of the shuttle plate, and because of the inherently fragile nature of the needles, the upwardly projecting portions thereof are subject to being broken off and thereby rendered ineffective. Also the needles should preferably be mounted so as to be pivoted or retracted to a non-projecting position upon the return movement of the shuttle plate to avoid undue scratching or tearing of the articles being fed. The needles and the spaces therebetween are also subject to becoming clogged with small bits of paper, paper lint and the like. This is especially true in the feeding of newspapers and similar soft newsprint articles. It is, therefore, a primary object of this invention to mount needle assemblies at the forward edge of a shuttle plate in a manner such as to avoid or minimize the foregoing difficulties, as enumerated immediately above, which have heretofore been encountered in feeding mechanisms of the general type described.

In accordance with this invention a forward edge of a shuttle plate is formed with a plurality of spaced-apart notches, and these notches include base surfaces which are canted at an angle with respect to the upper surface of the shuttle plate. Needle block assemblies are mounted on the lower surface of the shuttle plate adjacent the forward edge thereof in a manner such that individual needles are received within the notches. A plurality of the individual needles are fixed to a common shaft which is rotatably disposed within a needle block, and a leaf spring exerts a bias on the shaft to rotate the shaft and the needles to a position wherein the needles abut the canted base surfaces of the notches and project upwardly and forwardly from the upper surfaces of the base plate. In this position of the needles the canted base surfaces of the notches support a significant portion of the length of the needles and thereby minimize any tendency for stresses to become concentrated at some localized area within the needles. The bias exerted by the above-mentioned leaf spring is of a relatively small magnitude and enables the needles to be rotated within the notches to a position wherein the ends of the needles ride lightly against the under surface of the lowermost article in the stack during the return movement of the shuttle plate. Thus, the needles are freely rotatable within the needle blocks during the reciprocatory motion of the shuttle plate, and during such rotation the disposition of the needles within the slots is such as to effect a stripping action of the needles during each return movement of the shuttle plate. It is another object of this invention to incorporate the foregoing structure in a novel manner in a feeding mechanism to accomplish the desirable results described.

Another object of this invention is to so construct a feeding mechanism of the general type described hereinabove that the feeding mechanism may be readily utilized in conjunction with conventional transport mechanism commonly incorporated in printing machines now in use.

Other and related objects are to provide a feeding mechanism which is simply and inexpensively fabricated; to construct a feeding mechanism so as to enable the angular inclination of the shuttle plate and stacked articles to be varied; to provide a conveniently adjustable supply hopper which readily accommodates articles of varying length and width; and to enable the overall feeding mechanism to be readily removed from or associated with other transport mechanism of a printing machine.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 3 is a fragmentary detail view taken approximately in the direction of the arrows 3—3 in FIG. 1 and showing details of the mounting of the shuttle;

FIG. 4 is an end elevation view taken approximately in the direction of the arrows 4—4 in FIG. 3;

FIG. 9 is a fragmentary side elevation view showing details of a support assembly for mounting the feeding mechanism of the invention on a transport mechanism associated with a printing machine;

FIG. 10 is a fragmentary side elevation view showing, in bold and phantom outlines, the operative parts of the feeding mechanism of the invention at the extreme limits of the reciprocatory motion of the shuttle plate;

FIG. 11 is a fragmentary view, in section, taken approximately in the direction of the arrows 11—11 in FIG. 10;

The feeding mechanism of the invention is especially intended for use with a printing machine and associated transport mechanism of the type illustrated and described in the Morse Patent 2,359,852, issued October 10, 1944, to the same assignee as the present application. Reference may be had to this patent for further details of the transport mechanism associated with the printing machine, which transport mechanism forms no part of this invention but which is illustrated to the degree necessary to show the operative relationship of the feeding mechanism of this invention therewith.

Figure 1:
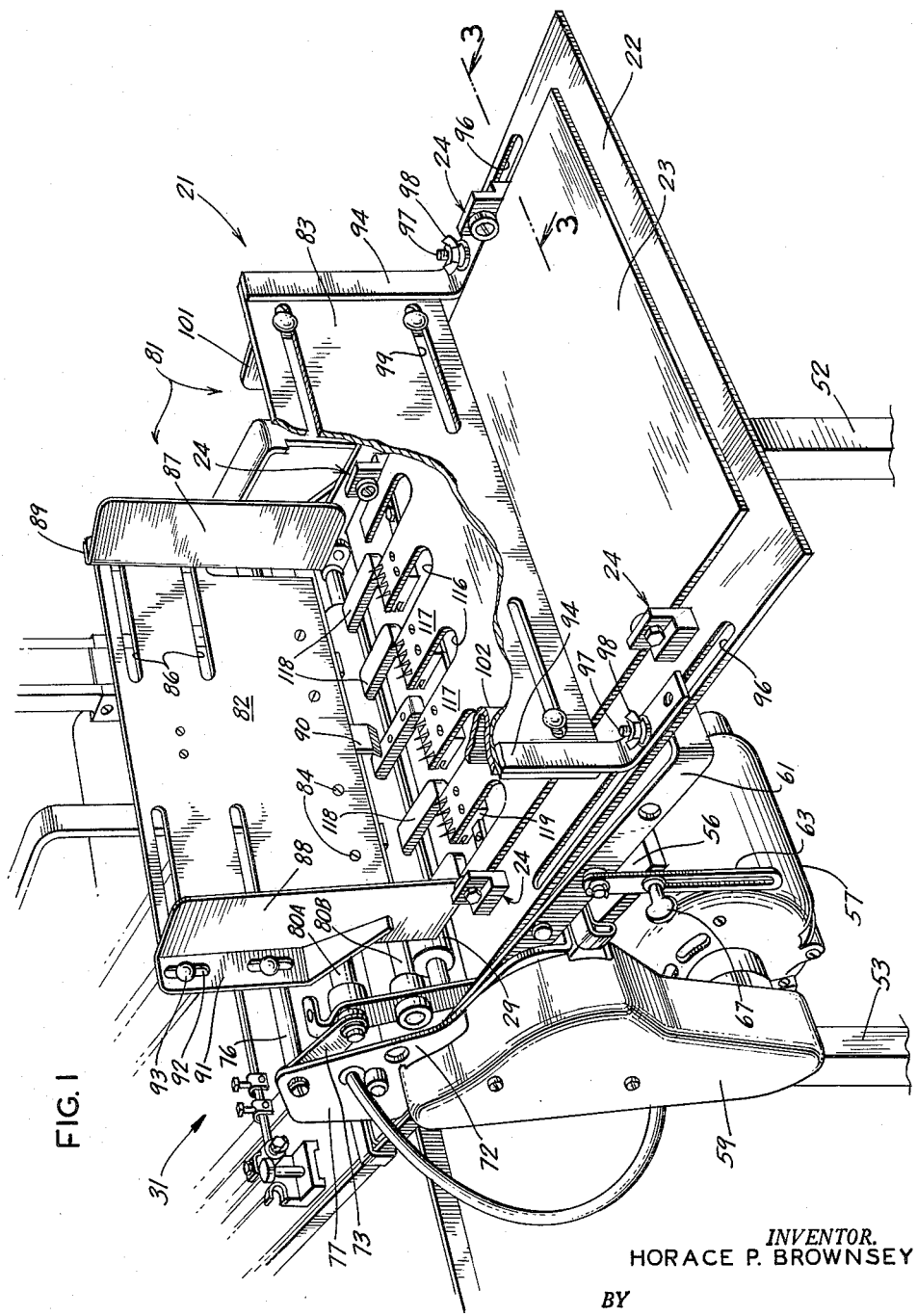
FIG. 1 is a perspective view taken from the rear and top of one embodiment of a feeding mechanism constructed in accordance with this invention.
Figure 2:
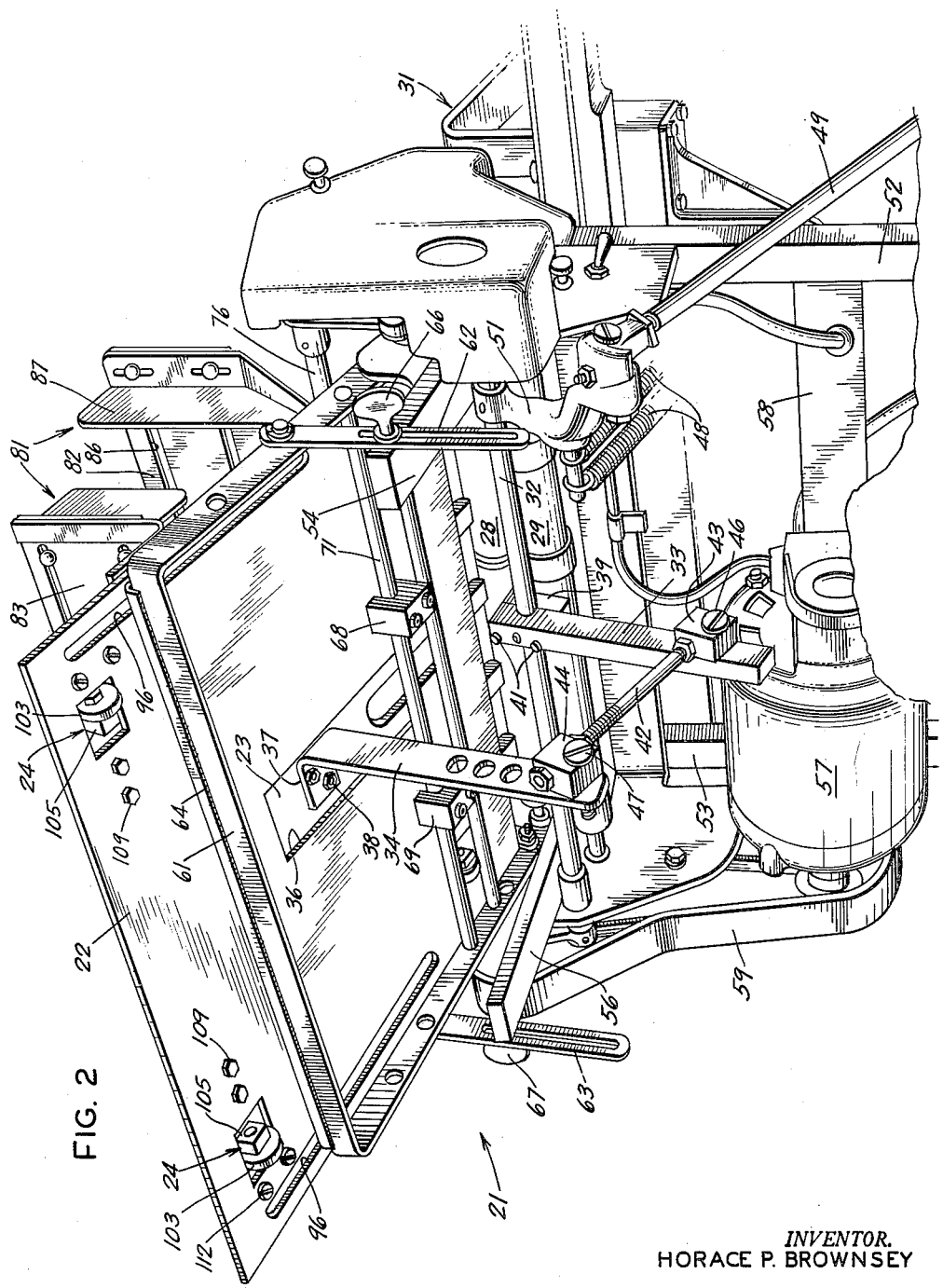
FIG. 2 is a perspective view taken from the bottom of the mechanism illustrated in FIG. 1.
Figure 5:
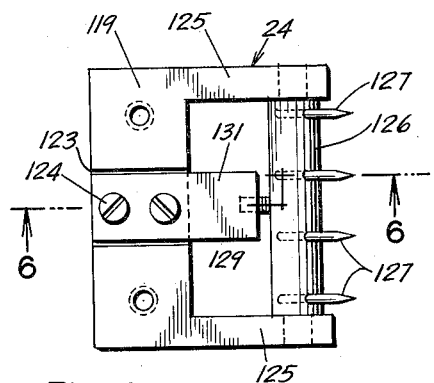
FIG. 5 is a detail view of a needle block assembly.
Figure 7:
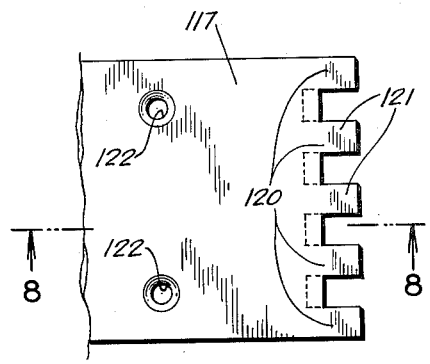
FIG. 7 is a fragmentary plan view of a portion of the shuttle plate for mounting the needle block assembly illustrated in FIG. 5.

With particular reference now to FIGS. 1 and 2 of the drawings, a feeding mechanism constructed in accordance with one embodiment of the invention is indicated generally by the reference numeral 21. The feeding mechanism 21 includes a base plate 22 on which a shuttle plate 23 is mounted for reciprocatory motion and supported by a plurality of bearing assemblies 24. The bearing assemblies 24 will presently be described in detail with reference to FIGS. 3 and 4. With continued reference to FIGS. 1 and 2, the shuttle plate 23 is movable toward and away from a pair of advancing rollers comprising an upper roller 28 and a lower roller 29. These advancing rollers are part of a transport mechanism indicated generally by the reference numeral 31, which is associated with a printing machine as described in greater detail in the above-mentioned Patent No. 2,359,852.

The means affording the drive for the reciprocatory motion of the shuttle plate 23 comprise a rock shaft 32, see FIG. 2, and a pair of crank arms 33 and 34. As illustrated in FIG. 2, the base plate 22 is formed with a longitudinally extending and generally rectangular-shaped slot 36 through which the upper end of the crank arm 34 is passed. This upper end portion of the crank arm 34 is formed with a flange 37 which is securely attached to the shuttle plate as by bolts 38. The upper end of the crank arm 33 is clamped to the rock shaft 32 by means of a clamping block 39 and cap screws 41. The lower end portions of the cranks 34 and 33 are connected together by a tie bolt 42 which is threaded at its opposite ends into pivot blocks 43 and 44 which are, in turn, connected to the crank arms by shoulder bolts 46 and 47, respectively, and in a manner to be described in greater detail with reference to FIG. 11. The rock shaft 32 is rotated back and forth through a limited angle by both a pair of tension springs 48 and a connecting rod 49, which are connected to a lever arm 51 fixedly positioned at one end of the rock shaft 32. The end of the connecting rod 49 opposite that connected to the lever 51 is connected to means associated with the drive mechanism of the printing machine so that the reciprocatory movement of the shuttle plate is coordinated with operation of the other components of the printing machine.

As best illustrated in FIG. 2, the transport mechanism 31 includes a frame which includes legs 52 and 53 and a pair of mounting rails 54 and 56. An electric motor 57 is mounted on a cross piece 58 extending between the legs 52 and 53 and is connected to drive the advancing rollers 28 and 29 by pulley and belt drive arrangement contained within the end cover 59.

The separating and feeding mechanism of this invention is adapted to be connected or removed as a unit from the transport mechanism 31 of the printing machine. The means enabling such an association or disassociation of the feeding mechanism 21 with the transport mechanism 31 to be effected include a support assembly comprising a main support member in the form of a bail 61 and a pair of slotted support struts 62 and 63. The bail 61 is disposed beneath the base plate 22 so as to support the base plate from the upper edge of the bail. Preferably, and as illustrated in FIG. 2, a strip 64 of rubber or some other suitable resilient material is interposed between the base plate and the upper edge of the bail. The struts 62 and 63 in turn support the bail member from the rails 54 and 56 respectively by means of collared thumb screws 66 and 67 which clamp the support struts to the outer sides of the rails. The slotted construction of the support struts enables the rearward portion of the feeding mechanism 21 to be elevated to pivot the forward portion of the feeding mechanism about a connection to the transport mechanism 31 in a manner to be described. While the inclination of the feeding mechanism 21 may thus be varied over a considerable range, most feeding applications can be satisfactorily accomplished with the base and shuttle plates in a substantially horizontal position as illustrated in FIGS. 1 and 2. The base plate 22 is maintained in a fixed longitudinal position with respect to the support bail 61 by a pair of clamping blocks 68 and 69 which are attached to the under surface of the base plate and which straddle a rod 71 extending between the opposite sides of the bail.

The forward end of the support bail 61, as noted above, is connected to the transport mechanism 31 so as to be pivotal about the connection to such transport mechanism. With reference now to FIG. 9 as well as FIG. 1, the forward ends of the side portions of the bail 61 each have a vertically extending bracket member 72 connected thereto in a pin-joint connection at the lower ends of the bracket members. A link 73 is connected at one end to the upper portion of each bracket 72 so as to be freely swingable thereabout. The free ends of the link member 73 are each formed with a slot which forms a hook 74 at the end of the link member. These hooks 74 are adapted to latch on to a rod 76, see FIG. 1, which extends between a pair of end plates incorporated in the transport mechanism 31. One of these plates, 77, is visible in FIG. 1. Additionally, and as illustrated in FIG. 9, the forwardmost edges of the support bail 61 are each formed with a concave recess 78, and a latching piece 79 is pin-jointed to the support bail at a location just rearwardly of each recess 78 in a manner such that the latching pieces 79 cooperate with the recesses 78 for latching this portion of the support bail on to a rod 75, see FIG. 9, which extends between the end plates of the transport mechanism but which is not visible in FIG. 1. Thus, the forward end of the support bail 61 can be readily attached to or removed from the transport mechanism 31, and the pin-jointed arrangement of the bracket 72 and links 73 enable the above-described tilting of the shuttle plate to be accomplished.

In accordance with this invention a hopper or supply magazine is positioned above the shuttle plate 23 for containing a stacked group of articles such as booklets, newspapers, or the like which are to be fed one by one to the transport mechanism 31. In FIGS. 1 and 2 this supply magazine is indicated generally by the reference numeral 81 and comprises a forward end piece 82 and a rearward end piece 83. In FIG. 1 it is seen that the bracket members 72 mount a pair of rods 80A and 80B therebetween. The forward end piece 82 of the supply magazine may preferably be clamped in a fixed position on these rods 80A and 80B as by a plurality of fillet head cap screws 84 and an additional clamping plate which is not visible in FIG. 1. The end piece 82 is formed with a plurality of laterally extending slots 86 which enable a pair of forward side pieces 87 and 88 to be selectively positioned along the inner surface of the end plate 82. The side pieces 87 and 88 are formed with outwardly projecting flange portions 89 and 91 respectively and these flange portions are each formed with vertically extending slots 92. Bolts 93 extend through the vertically extending slots in the flange portions and the horizontally extending slots in the end piece and thus enable the side pieces 87 and 88 to be positioned vertically as well as horizontally as viewed in FIG. 1.

A depending separator blade 90 is mounted on the shafts 80A and 80B so as to extend slightly below the lower edge of the end piece 82 and thereby aid in guiding the forward edge of an article being fed to the advancing rollers 28 and 29.

The bearing assemblies 24 are each of essentially the same construction, which construction is shown in detail in FIGS. 3 and 4. With reference now to FIGS. 3 and 4, it is seen that the bearing assembly 24 comprises both an upper and a lower roller assembly which are separate one from the other. The lower roller assembly comprises a ball bearing 103 which projects through an opening 104 in the base plate 22. The outer race of the bearing 103 engages the underside of the shuttle plate and is rollable thereon. The inner race of the ball bearing is clamped to a mounting block 105 by a cap screw 106. The mounting block 105 is in turn riveted to a strip 107 which is spaced upwardly from the base plate 22 by means of spacer pieces 108 and bolts 109.

The upper roller assembly comprises a mounting block 111 which is fixed to the upper surface of the base plate 22 by cap screws 112. The upper roller assembly also includes a roller 113 which is rotatably mounted on the block 111 by a shoulder bolt 114. Thus, the shuttle plate 23 is constrained from movement in either a downward or an upward direction by the ball bearing 103 and the roller 113. Furthermore, the inner surface of the mounting block 111 serves as a guide, in conjunction with similar inner surfaces of the other bearing assemblies, to maintain the alignment of the shuttle plate during reciprocatory movement.

In accordance with this invention there are provided means at the forward end portion of the shuttle plate for insuring positive engagement of the shuttle plate with the article to be fed. These means include needle block assemblies mounted adjacent the forward edge of the shuttle plate 23 for piercingly engaging the lowermost article of a stacked group contained within the supply magazine 81 to thereby insure separation and feeding of the lowermost article during movement of the shuttle plate in a forward direction toward the advancing rollers 28 and 29 heretofore described.

With reference now to FIG. 1 it is seen that the forward portion of the shuttle plate 23 is formed with a plurality of generally U-shaped recesses 116 which leave a series of bars 117 projecting forwardly between the U-shaped recesses. A series of strips 118 are mounted on the upper surface of the base plate 22 adjacent the forward end thereof and are spaced one from the other so as to be received within the recesses 116 whenever the shuttle plate 23 is moved forwardly from the position illustrated in FIG. 1. As illustrated in FIG. 1, the bars 117 are six in number and the four inner bars are adapted to mount needle block assemblies 119 upon the under surface thereof. The manner in which each needle block assembly 119 is mounted on a forward portion 117 of the shuttle plate 23 is illustrated in greater detail in FIGS. 5 through 8.

With reference now to FIGS. 5 through 8, it is seen that the forwardmost edge of a bar 117 has a plurality of equally spaced fingers 120 defining notches 121 therebetween. The base surface 121B of each notch 21 is canted at approximately a 45° angle, with respect to the upper and lower surfaces of the shuttle plate, and this is best illustrated in the enlarged view of FIG. 8. Additionally, the bars 117 are each provided with two countersunk apertures 122 which are adapted to receive flat head screws for mounting the needle block assemblies 119 to the shuttle plate.

The needle block assemblies 119 each include a block member formed with a central recessed groove 123 and two forwardly projecting arms 124 and 125. A shaft 126 is rotatably mounted between the forward ends of the arms 124 and 125 and mounts a plurality of needles 127, each of which is preferably retained within the shaft by a set screw 128. The rotatable shaft 126 also includes a tab member 129 which is fixed to the shaft by any suitable means. A generally rectangular-shaped leaf spring 131 is mounted within the recess 123 by cap screws 124 in a manner such that the free end of the leaf spring contacts the tab member 129 and biases the shaft and needles toward the position illustrated in FIGS. 5 and 6.

Figure 8:
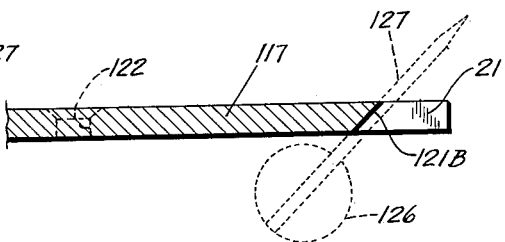
FIG. 8 is an enlarged elevation view, in section, taken approximately in the direction of the arrows 8—8 in FIG. 7.
Figure 12:
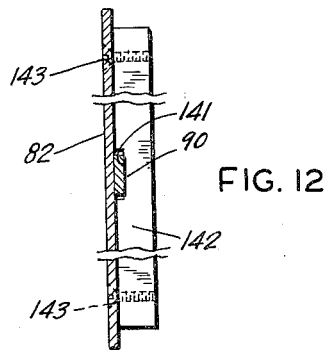
FIG. 12 is a fragmentary view taken in the direction of the arrows 12—12 in FIG. 10.
Figure 13:
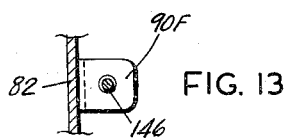
FIG. 13 is a fragmentary view taken in the direction of the arrows 13—13 in FIG. 10.
Figure 14:
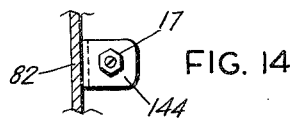
FIG. 14 is a fragmentary view taken in the direction of the arrows 14—14 in FIG. 10.

With a needle block assembly 119 attached to the under surface of a bar 117 of the base plate, the leaf spring 131 is effective to bias the shaft and needles toward the position shown in phantom outline in FIG. 8 wherein each needle 127 abuts and is supported by the base surface 121B of a corresponding notch 121. This is the position assumed by the shafts and needles whenever the shuttle plate is moved in a feeding direction, and the angular disposition of the needles, in conjunction with the support afforded by the base surface 121B, is effective to prevent such a stress being developed at some localized point along the length of the needle as might cause breakage of the needle.

The base surfaces 121B also limit the extent to which the needles 127 project upwardly from the shuttle plate and thus serve to control the depth of penetration of the needles within the form being fed. In this manner the base surfaces of the notches 121 function as means for preventing the needles from engaging more than one form on each forward movement of the shuttle plate.

Figure 6:
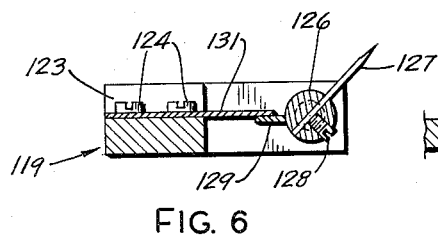
FIG. 6 is an elevation view, in section, taken approximately along the lines 6—6 in FIG. 5.

The bias afforded by the leaf spring 131 is of a relatively small magnitude so that the shaft 126 and the needles 127 are readily rotated, in a clockwise direction as viewed in FIG. 6, to a position wherein the needles are moved to a non-projecting position while riding lightly along the under surface of the lowermost article in the stack contained within the supply hopper. The width of each of the notches 121 is somewhat greater than that of a corresponding needle 127, and as a consequence of such rotation of the needles, the disposition of the needles 127 within the slots is effective to strip off any foreign matter, such as small bits of paper or paper lint, which might otherwise clog the space between the needles and ultimately limit effective operation of the needles.

In accordance with this invention separator means are included in the feeding mechanism for assuring that only a single article is fed from the stacked group within the supply magazine 81 on each feeding movement of the shuttle plate 23. As best illustrated in FIGS. 10 and 12–14, the separator means include the separator blade 90 which is mounted on the end plate 82 so as to be adjustably positionable with respect to the base plate 22 and in particularly with reference to a strip 118. The separator blade 90 is formed with a flange 90F at the end opposite that adjacent the base plate 22 and is slidably received within a recess 141 in a bar 142. The bar 142 is mounted on the end plate 182 as by flat head screws 143, and the surfaces of the recess 141 coact with a surface of the end plate 82 to afford guide means for the separator blade 90.

A block 144 is also mounted on the end plate 82, preferably by flat head screws as illustrated and is located above the bar 142. A threaded stud 146 having a slot in the upper end thereof, is passed through both the block 144 and the flanged end 90F of the separator blade. Preferably, both the block 144 and the flange 90F are internally threaded, and the nuts 147 are provided for locking the stud 146 and the separator blade 90 at any selected vertical position. Thus, the spacing of the lower end of the separator blade 90 from the strip 118 may be selected to be just sufficient to permit the passage of a single article or form therebetween. It will be recognized that the blade 90 is thus effective to hold back the other forms within the hopper 81.

With reference now to FIG. 10 of the drawings, the overall operation of the separating and feeding mechanism of this invention will be briefly reviewed. In FIG. 10 a plurality of individual articles such as newspapers are indicated by the reference numeral 132 and are illustrated as stacked within the supply hopper 81. In the case of articles having folded ends like those illustrated in FIG. 10, the folded end is preferably disposed at the forward end of the shuttle plate. With the shuttle plate in the extreme retracted position shown by the bold outlines, the force of the spring 131 is not sufficient to cause the needles to piercingly engage the lowermost article 132L of the stack within the hopper. However, immediately upon movement of the shuttle plate 23 toward the advancing rollers 28 and 29 the points of the needles 127 begin to pierce the article 132L and assure separation and feeding of this article to the position illustrated by the phantom outlines wherein the folded edge of the article is nipped between the advancing rollers 28 and 29. This motion of the shuttle plate is effected by movement of the crank arms 33 and 34 to the positions illustrated by the phantom outlines. Subsequently, the shuttle plate is returned to the position illustrated by the bold outlines and during such return movement the needles are rotated to a non-projecting position wherein the points of the needles ride lightly against the under surface of the next article to be separated from the stack and fed to the advancing rollers. As described hereinabove, the separator blade 90 is effective to hold back any articles or forms which might be carried along with the lowermost form being fed to the advancing rollers 28 and 29.

Thus, in accordance with this invention needle block assemblies are incorporated at a forward edge of a shuttle plate in a manner such that the needles are supported by canted base surfaces of notches formed in the forward edge of the plate in a manner such as to minimize any tendency for the articles being fed to break off the projecting portions of the needles. The notches also serve to control the depth the needles can penetrate the form being fed and thereby prevent the needles from penetrating more than one form. Additionally, a separator blade is adjustably positionable to prevent the feeding of more than a single form or article on each forward movement of the shuttle plate. Spring means are effective to assure engagement of the needles with the article being fed, and the disposition of the needles within the slots is such as to effect a stripping action of the needles during each return movement of the shuttle plate. The overall feeding mechanism is of a relatively simple and inexpensive construction and is readily mounted on or removed from conventional printing machine transport mechanism presently in use.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a feeding mechanism of the kind having a shuttle plate movable in a forward feeding direction and a rearward direction beneath a stack of articles for separating a lowermost article from the stack and transporting the lowermost article to additional advancing apparatus on each forward movement of the shuttle plate, means at the forward end portion of said shuttle plate for insuring positive engagement of the shuttle plate with the lowermost article comprising a series of spaced fingers defining notches in the forward edge of the shuttle plate and a needle block assembly mounted beneath said notches, said needle block assembly including, a shaft rotatably mounted therein, a plurality of needles fixed to the shaft in a manner such that an individual needle is movable within each notch between a first projecting position and a second non-projecting position with respect to the shuttle plate, and spring means connected to effect rotation of the shaft and movement of the needles to said first position.

2. In a feeding mechanism of the kind having a shuttle plate movable in a forward feeding direction and a rearward direction beneath a stack of articles for both separating a lowermost article from the stack and transporting the lowermost article to additional advancing apparatus on each forward movement of the shuttle plate, means at the forward end portion of said shuttle plate for insuring positive engagement of the shuttle plate with the lowermost article comprising a series of spaced fingers defining notches in the forward edge of the shuttle plate and a needle block assembly mounted beneath said notches, said needle block assembly including, a shaft rotatably mounted therein, a plurality of needles fixed to the shaft in a manner such that an individual needle is movable within each notch between a first position wherein a part of the needle projects above the upper surface of the shuttle plate and a second position wherein substantially all parts of the needle are disposed beneath the upper surface of the shuttle plate, and spring means connected to effect rotation of the shaft and movement of the needles to said first position, said notches being closely spaced and of a relatively narrow width so that the disposition of the needles within the notches is effective to strip foreign matter from said needles during movement of the needles from the first to the second positions.

3. In a feeding mechanism of the kind having a shuttle plate movable in a forward feeding direction and a rearward direction beneath a stack of articles for separating a lowermost article from the stack and transporting the lowermost article to adidtional advancing apparatus on each forward movement of the shuttle plate, means at the forward end portion of said shuttle plate for insuring positive engagement of the shuttle plate with the lowermost article comprising a series of fingers defining notches in the forward edge of the shuttle plate and a needle block assembly mounted beneath said notches, said needle block assembly including, a shaft rotatably mounted therein, a plurality of needles fixed to the shaft in a manner such that an individual needle is movable within each notch between a first position wherein a part of the needle projects above the upper surface of the shuttle plate and a second position wherein substantially all parts of the needle are disposed beneath the upper surface of the shuttle plate, and spring means connected to effect rotation of the shaft and movement of the needles to said first position, said notches having base surfaces inclined downwardly and rearwardly from the upper surface of the shuttle plate and effective to engage a portion of the length of each needle in said first position so as to afford a support for each needle and direct each needle forwardly and upwardly from the upper surface of the shuttle plate.

4. A feeding mechanism for use with a printing machine and comprising a shuttle plate movable in forward, feeding and rearward, retracting directions for separating individual articles from a stack disposed upon the upper surface of the shuttle plate and feeding such articles one by one to a transport apparatus associated with a printing machine, said shuttle plate having spaced-apart notches formed in a forward edge of the shuttle plate, said notches having base surfaces which are canted rearwardly and downwardly from the upper surface of the plate, needle means pivotally mounted adjacent said forward edge of the shuttle plate including an individual needle disposed within each of said notches, and means biasing said needle means toward a first position wherein a portion of each needle abuts and is supported by a respective base surface and wherein an additional portion of each needle projects above said shuttle plate, said needle means being rotatable against the force of said biasing means to a second position wherein substantially all portions of each needle are disposed beneath the upper surface of said shuttle plate, the width of said notches being related to the width of said needles so as to be effective to strip any foreign matter from said needles during movement of said needles to said second, non-projecting position.

5. A feeding mechanism for separating individual articles from a group and feeding such articles in one-by-one relation to transport apparatus associated with a printing machine, said feeding mechanism comprising, a base plate, a shuttle plate mounted on said base plate for reciprocatory movement thereon, means for containing a group of articles in stacked relation over said shuttle and base plates and in engagement with said shuttle plate, drive means for moving the shuttle plate in feeding and retracting directions and thereby producing said reciprocatory movement, needle means pivotably mounted on the shuttle plate, said needle means including an individual needle disposed within each one of a series of notches formed in a forward, feeding edge of the shuttle plate, and spring means biasing the needle means toward a position wherein the needle means are effective to engage an article during movement of said shuttle plate in a feeding direction.

6. A feeding mechanism for separating individual articles from a group and feeding such articles in one-by-one relation to transport apparatus associated with a printing machine, said feeding mechanism comprising, a base plate, a shuttle plate mounted on said base plate for reciprocatory movement thereon, a supply magazine for containing a group of articles in stacked relation over said shuttle and base plates and in engagement with said shuttle plate, said supply magazine being mounted on said base plate so as to be adjustably positionable thereon and including members adjustable with respect to one another so that said supply magazine readily accommodates articles of varying configurations, drive means for moving the shuttle plate in feeding and retracting directions and thereby producing said reciprocatory movement, needle means pivotably mounted at one end of shuttle plate, said needle means including an individual needle disposed within each one of a series of notches formed in a forward, feeding edge of the shuttle plate, and spring means biasing the needle means toward a position wherein the needle means are effective to engage an article during movement of said shuttle plate in a feeding direction.

7. A feeding mechanism for separating individual articles from a group and feeding such articles in one-by-one relation to transport apparatus associated with a printing machine, said feeding mechanism comprising, a base plate, a shuttle plate mounted on said base plate for reciprocatory movement thereon, means for containing a group of articles in stacked relation over said shuttle and base plates and in engagement with said shuttle plate, drive means for moving the shuttle plate in feeding and retracting directions and thereby producing said reciprocatory movement, needle means pivotably mounted at an end of the shuttle plate, said needle means including an individual needle disposed within each one of a series of notches formed in a forward, feeding edge of the shuttle plate, spring means biasing the needle means toward a position wherein the needle means are effective to engage a sheet during movement of said shuttle plate in a feeding direction, and mounting means including latching pieces adapting the feeding mechanism for convenient connection to and removal from said transport apparatus as a unit.

8. A feeding mechanism as defined in claim 7 wherein the mounting means include a main support member and support struts and wherein the latching pieces and support struts are pivotally connected to the main support member so that the angular inclination of the feeding mechanism is variable.

9. A feeding mechanism for separating individual articles from a group and feeding such articles in one-by-one relation to transport apparatus associated with a printing machine, said feeding mechanism comprising, a base plate, a shuttle plate disposed above said base plate, means supporting said shuttle plate for reciprocatory movement on the base plate including rollers engageable with both the lower and upper surfaces of the shuttle plate and guide blocks engageable with the edges of the shuttle plate for restraining any lateral movement of the shuttle plate, means for containing a group of sheets in stacked relation over said shuttle and base plates and in engagement with said shuttle plate, drive means for moving the shuttle plate in feeding and retracting directions and thereby producing said reciprocatory movement, needle means pivotably mounted at an end of the shuttle plate, said needle means including an individual needle disposed within each one of a series of notches formed in a forward, feeding edge of the shuttle plate, and spring means biasing the needle means toward a position wherein the needle means are effective to engage an article during movement of said shuttle plate in a feeding direction.

10. A feeding mechanism for separating individual articles from a group and feeding such articles in one-by-one relation to transport apparatus associated with a printing machine, said feeding mechanism comprising, a base plate, a shuttle plate mounted on said base plate for reciprocatory movement thereon, means for containing a group of articles in stacked relation over said shuttle and base plates and in engagement with said shuttle plate, drive means for moving the shuttle plate in feeding and retracting directions and thereby producing said reciprocatory movement, needle means pivotably mounted at an end of a shuttle plate for engaging an article during movement of the shuttle plate in a feeding direction, said needle means including an individual needle disposed within each one of a series of notches formed in a forward, feeding edge of the shuttle plate, and separator means for preventing feeding of more than one article on each such feeding movement of the shuttle plate.

11. A feeding mechanism for separating individual articles from a group and feeding such articles in one-by-one relation to transport apparatus associated with a printing machine, said feeding mechanism comprising, a base plate, a shuttle plate mounted on said base plate for reciprocatory movement thereon, container means for containing a group of articles in stacked relation over said shuttle and base plates and in engagement with said shuttle plate, drive means for moving the shuttle plate in feeding and retracting directions and thereby producing said reciprocatory movement, needle means pivotably mounted at an end of a shuttle plate for engaging an article during movement of the shuttle plate in a feeding direction, said needle means including an individual needle disposed within each one of a series of notches formed in a forward, feeding edge of the shuttle plate, and separator means, including a blade mounted on said container means and adjustably positionable thereon, for preventing the feeding of more than a single article from the stacked group on each feeding movement of the shuttle plate.

12. A feeding mechanism for separating individual articles from a group and feeding such articles in one-by-one relation to transport apparatus associated with a printing machine, said feeding mechanism comprising, a base plate, a shuttle plate mounted on said base plate for reciprocatory movement thereon and having a plurality of notches formed in a forward edge thereof, means for containing a group of articles in stacked relation over said shuttle and base plates and in engagement with said shuttle plate, drive means for moving the shuttle plate in feeding and retracting directions and thereby producing said reciprocatory movement, needle means pivotably mounted at an end of the shuttle plate and including a block member and a shaft rotatably mounted therein, said shaft having a plurality of needles fixed thereto in a manner such that a needle is disposed within each notch, and spring means biasing the needle means toward a first position wherein the needle means are effective to engage an article during movement of said shuttle plate in a feeding direction, said shaft being rotatable about the pivotal mounting on the shuttle plate to a second position wherein the points of the needles are slidable along an under surface of an article during movement of said shuttle plate in a retracting direction.

13. A feeding mechanism as defined in claim 12 wherein the notches include base surfaces inclined downwardly and rearwardly from the upper surface of the shuttle plate and wherein the base surfaces afford a support for the needles in said first position.

14. A feeding mechanism as defined in claim 12 including separator means mounted on the container means and adjustably positionable in a transverse direction with respect to the shuttle plate for preventing feeding of more than a single article from the stacked group on each feeding movement of the shuttle plate.

References Cited in the file of this patent

UNITED STATES PATENTS

| | | |
|---|---|---|
| 235,952 | Leavitt | Dec. 28, 1880 |
| 704,058 | Lilly | July 8, 1902 |
| 999,009 | Cleal et al. | July 25, 1911 |
| 1,121,556 | Halvorsen | Dec. 15, 1914 |
| 1,155,503 | Moore | Oct. 5, 1915 |
| 1,592,367 | Hren et al. | July 13, 1926 |
| 2,187,123 | Harm | Jan. 16, 1940 |